United States Patent
Harmer et al.

(10) Patent No.: US 6,248,930 B1
(45) Date of Patent: Jun. 19, 2001

(54) FLUORINE-MODIFIED PERFLUORINATED ION-EXCHANGE MICROCOMPOSITE CATALYSTS

(75) Inventors: Mark Andrew Harmer; Qun Sun, both of Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/380,417

(22) PCT Filed: Mar. 4, 1998

(86) PCT No.: PCT/US98/04244

§ 371 Date: Sep. 1, 1999

§ 102(e) Date: Sep. 1, 1999

(87) PCT Pub. No.: WO98/39097

PCT Pub. Date: Sep. 11, 1998

Related U.S. Application Data

(60) Provisional application No. 60/039,356, filed on Mar. 7, 1997, now abandoned.

(51) Int. Cl.[7] .............. C07C 2/66; C07C 2/68; C07C 2/70; B01J 31/00
(52) U.S. Cl. .......... 585/462; 585/456; 585/463; 585/464; 502/159; 502/402
(58) Field of Search ................ 585/456, 462, 585/463, 464; 502/159, 402

(56) References Cited

U.S. PATENT DOCUMENTS

| | | | |
|---|---|---|---|
| 3,879,489 | 4/1975 | Yurchak et al. | 260/683.44 |
| 4,038,213 | 7/1977 | McClure et al. | 252/430 |
| 4,673,769 | 6/1987 | Farcasiu | 585/458 |
| 5,094,995 | * 3/1992 | Butt et al. | 502/402 |
| 5,220,087 | * 6/1993 | Berenbaum et al. | 585/462 |
| 5,344,997 | * 9/1994 | Kocal | 568/628 |
| 5,824,622 | * 10/1998 | Harmer et al. | 502/407 |
| 5,916,837 | * 6/1999 | Harmer et al. | 502/170 |
| 5,948,946 | * 9/1999 | Harmer et al. | 585/669 |
| 6,034,290 | * 3/2000 | Harmer et al. | 570/236 |
| 6,107,233 | * 8/2000 | Harmer et al. | 502/159 |

FOREIGN PATENT DOCUMENTS

| | | |
|---|---|---|
| 0 426 846 A1 | 5/1991 | (EP) . |
| WO 95/19222 | 7/1995 | (WO) . |

OTHER PUBLICATIONS

K. A. Mauritz et al., Nafion–Based Microcomposites: Silicon Oxide–Filled Membranes, *Polym. Mater. Sci. Eng.*, 58, 1079–1082 (1988).

K. A. Maruitz et al., Perfluorinated–Ionomer–Membrane–Based 16, 401–417 Microcomposites, *Multiphase Polymers: Blends and Ionomers*, The American Chemical Society (1989).

G. A. Olah et al., Perfluorinated Resinsulfonic Acid (Nafion–H®) Catalysis in Synthesis, *Synthesis*, 513–531 (1986).

F. J. Waller, Catalysis with Metal Cation–Exchanged Resins, *Rev.–Sci. Eng.*, 1–12 (1986).

* cited by examiner

*Primary Examiner*—Walter D. Griffin

(57) ABSTRACT

This invention concerns fluorine-modified perfluorinated ion-exchange microcomposites, comprising a perfluorinated ion-exchange polymer containing pendant sulphonic acid groups and/or carboxylic acid groups, entrapped within and highly dispersed throughout a network of inorganic oxide, said network having a plurality of fluoride groups bonded thereto; processes for their preparation and their use as catalysts in chemical processes such as alkylation of aromatic compounds.

12 Claims, No Drawings

FLUORINE-MODIFIED PERFLUORINATED ION-EXCHANGE MICROCOMPOSITE CATALYSTS

CROSS-REFERENCE TO RELATED APPLICATIONS

This application is a national entry under 35 U.S.C 371 of PCT/US98/04244 which claims priority benefit of U.S. Provisional Application No. 60/039,536, filed Mar. 7, 1997, now abandoned.

FIELD OF THE INVENTION

This invention concerns catalysts comprising chemically modified perfluorinated ion-exchange microcomposites, processes for their preparation and their use as catalysts in chemical processes.

TECHNICAL BACKGROUND

K. A. Mauritz et al., Polym. Mater. Sci. Eng. 58, 1079–1082 (1988), in an article titled "Nafion-based Microcomposites: Silicon Oxide-filled Membranes", discuss the formation of micro composite membranes by the growth of silicon oxide microclusters or continuous silicon oxide interpenetrating networks in pre-swollen "NAFION®" sulfonic acid films. NAFION® is a registered trademark of E. I. du Pont de Nemours and Company.

U.S. Pat. No. 4,038,213 discloses the preparation of catalysts comprising perfluorinated ion-exchange polymers containing pendant sulfonic acid groups on a variety of supports.

The catalyst utility of perfluorinated ion-exchange polymers containing pendant sulfonic acid groups, supported and unsupported has been broadly reviewed: G. A. Olah et al., Synthesis, 513–531 (1986) and F. J. Waller, Catal. Rev.-Sci. Eng., 1–12 (1986).

WO 95/19222 describes a porous microcomposite comprising a perfluorinated ion-exchange microcomposite containing pendant sulfonic acid and/or carboxylic acid groups entrapped within and highly dispersed throughout a network of metal oxide. These catalysts are differentiated from NAFION® supported catalysts in that by virtue of the preparation of the microcomposite catalyst, the polymer, in solution, becomes intimately mixed with a metal oxide network precursor in solution, and thus becomes thoroughly entrapped and highly dispersed throughout a resulting network of metal oxide. With the polymer being mechanically entrapped within the metal oxide network and not merely on the surface of a support, as is the case in supported catalysts, the catalytic activity of these microcomposites is significantly increased.

Although a variety of reactions can be beneficially catalyzed by the compounds and the composites cited above, there is still a need for catalysts of increased activity and selectivity and broader applications.

SUMMARY OF THE INVENTION

The present invention provides a fluorine-modified porous microcomposite, comprising: a perfluorinated ion-exchange polymer containing pendant sulfonic acid groups and/or pendant carboxylic acid groups, wherein the polymer is entrapped within and highly dispersed throughout a network of inorganic oxide, said network having a plurality of fluoride atoms bonded thereto.

The present invention also provides a process for the preparation of a fluorine-modified porous microcomposite, comprising: contacting a porous microcomposite comprising a perfluorinated ion-exchange polymer containing pendant sulfonic acid groups and/or carboxylic acid groups, wherein said polymer is entrapped within and highly dispersed throughout a network of inorganic oxide, with an effective amount of a fluorinating agent under fluorinating conditions whereby a plurality of hydroxyl groups of the inorganic oxide network are replaced by fluoride groups.

The present invention further provides a method of alkylating an aromatic compound, the improvement comprising using an effective amount of a catalyst composition comprising a fluorine-modified porous microcomposite comprising a perfluorinated ion-exchange polymer containing pendant sulfonic acid groups and/or pendant carboxylic acid groups, wherein the polymer is entrapped within and highly dispersed throughout a network of inorganic oxide, said network having a plurality of fluoride groups bonded thereto.

DETAILED DESCRIPTION OF THE INVENTION

The present invention concerns the modification of a porous microcomposite. By "porous microcomposite" is meant a composition comprising a perfluorinated ion-exchange polymer (PFIEP) containing pendant sulfonic acid groups and/or pendant carboxylic acid groups, wherein said polymer is entrapped within and highly dispersed throughout a network of inorganic oxide. The percentage of the perfluorinated ion-exchange polymer in the microcomposite is from 0.1 to about 90% by weight and the size of the pores in the microcomposite is about 1 nm to about 75 nm, and the microcomposite optionally further comprises pores having a size in the range of about 75 nm to about 1000 nm. Such microcomposites are described in U.S. application Ser. No. 08/574,571 incorporated by reference herein and in a corresponding PCT publication WO 95/19222. The microcomposite can be in any size or shape to be utilized in the present invention, such as ground into particles or shaped into spheres. The PFIEP preferably contains pendant sulfonic acid groups, and is most preferably, a sulfonated NAFION® PFIEP. The weight percentage of PFIEP preferably ranges from about 5% to about 80%, most preferably from about 10% to about 15%. The inorganic oxide of the network is preferably silica, alumina, titania, germania, zirconia, alumino-silicate, zirconyl-silicate, chromic oxide, iron oxide, or mixtures thereof; most preferably silica.

The inorganic oxide network of the present fluorine-modified porous microcomposite has a plurality of fluoride groups bonded thereto. By "having a plurality of fluoride groups bonded thereto" is meant that a portion of the hydroxyl groups of the inorganic oxide network, preferably at least 50% of the hydroxyl groups, most preferably at least 80% of the hydroxyl groups, are replaced by a fluoride group via reaction with a fluorinating agent, and each fluoride group is bonded to the inorganic oxide network. As is known, after formation of an inorganic oxide network, there are numerous residual hydroxyl groups. This is because during network formation each of the inorganic atoms become constituents of a network structure via bonds to other inorganic atoms through oxygen but condensation to form these crosslinks does not go to 100% completion; there are residual, uncrosslinked hydroxyl groups. For example, in the present case where the inorganic oxide of the network in the microcomposite is silica, silanol (Si—OH) groups can be found as part of the network, and it is a plurality of the hydroxyl (—OH) groups of these silanols that are converted to fluoride groups which are bonded to the network.

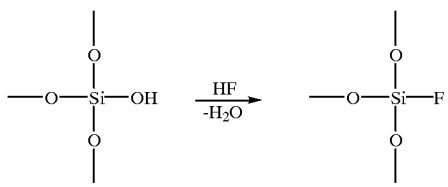

Preferably the fluorine-modified microcomposite comprises an inorganic oxide network wherein the inorganic oxide is silica, and the entrapped and highly dispersed PFIEP contains pendant sulfonic acid groups The present invention also provides a process for the preparation of a fluorine-modified porous microcomposite, comprising: contacting a porous microcomposite comprising a perfluorinated ion-exchange polymer containing pendant sulfonic acid groups and/or carboxylic acid groups, wherein said polymer is entrapped within and highly dispersed throughout a network of inorganic oxide, with an effective amount of a fluorinating agent under fluorinating conditions whereby a plurality of hydroxyl groups of the inorganic oxide network are replaced by fluoride groups.

In the present process, a porous microcomposite, as described above, is contacted with a fluorinating agent. By "fluorinating agent" is meant a reagent capable of reacting with a plurality of the hydroxyl groups of the inorganic oxide network to generate bonded fluoride groups. Preferably the fluorinating agent comprises a reagent selected from the group consisting of: hydrofluoric acid, a mixture of hydrogen fluoride and pyridine, ammonium fluoride, fluorine and a compound having a group of the formula $R^1R^2R^3N^+$-fluorine, wherein each $R^1$, $R^2$ and $R^3$ are independently selected from an aliphatic or ring hydrocarbon. It may be desirable for the fluorinating agent to further comprise an organic solvent and/or an organic base. In some cases the solvent and the base functions can be satisfied by the same compound. Representative examples of basic organic solvents are pyridine, trimethylpyridine and the like.

By "fluorinating conditions" is meant those conditions necessary to replace a hydroxyl group of the inorganic oxide network with a fluoride group. For certain reagents, anhydrous conditions should be used. Preferably, the porous microcomposite is dried prior to its contact with the fluorinating agent. When hydrofluoric acid is used as the fluorinating agent, it is preferable that it is used in conjunction with an organic solvent. Hydrofluoric acid is capable of dissolving certain inorganic oxide networks if used in too concentrated a form or if used in excess. The present process can be carried out in an inert atmosphere, such as nitrogen. Preferably, the fluorine-modified porous microcomposite is dried prior to its use as a catalyst at temperatures ranging from room temperature to about 280° C. in air or vacuum.

In a preferred embodiment of the present process, the inorganic oxide of the network of the porous microcomposite is silica, the PFIEP contains pendant sulfonic acid groups, and the fluorinating agent is a mixture of anhydrous hydrogen fluoride and pyridine. A most preferred fluorinating agent comprises 70 wt % hydrogen fluoride/30 wt % pyridine, such as is commercially available from Aldrich Chemical, Milwaukee, Wis.

Analysis has demonstrated that the fluorine content of the microcomposite is increased by at least a few percent as a result of the fluorination reaction. The fluorine-modified microcomposite has also been found to be hydrophobic. Further, comparative testing has demonstrated that, for at least one reaction, catalytic activity is increased versus a microcomposite that has not been contacted with a fluorinating agent.

The present invention further provides a method of alkylating an aromatic compound, the improvement comprising using an effective amount of a catalyst composition comprising a fluorine-modified porous microcomposite comprising a perfluorinated ion-exchange polymer containing pendant sulfonic acid groups and/or pendant carboxylic acid groups, wherein the polymer is entrapped within and highly dispersed throughout a network of inorganic oxide, said network having a plurality of fluoride groups bonded thereto. By utilizing an effective amount of a catalyst composition comprising the fluorine-modified porous microcomposite described above, a significant improvement in catalytic activity can be realized as compared to a porous microcomposite prior to fluorine modification. This improvement is made under normal alkylation conditions. Thus, in the present process, an aromatic compound is contacted with a $C_2$ to $C_5$ monoolefin, mixtures thereof, or a hydrocarbon stream containing such olefins, in the liquid phase and at a temperature of between about 80° C. and about 225° C. in the presence of the catalyst composition comprising the fluorine-modified porous microcomposite of the present invention.

During alkylation, the aromatic compound, such as benzene, toluene, or naphthalene, is contacted with an olefin selected from the group consisting of $C_2$ to $C_5$ monoolefins, mixtures thereof or a hydrocarbon stream containing such olefins. Examples of suitable olefins include propylene, isobutylene, butene-1, butene-2, trimethylethylene, isomeric amylenes and mixtures thereof. In use, these olefins may also contain other hydrocarbons. Alkylation may also be performed using alcohols; alkyl halides, such as butylbromide or propylchloride; and alkyl esters using the fluorine-modified porous microcomposite of the present invention as a catalyst. The present process may be carried out either as a batch or continuous type of operation with continuous being preferred for commercial systems. Use of agitation may be desirable in a batch operation to ensure effective contact of the reactants and the catalyst.

Reaction temperature is varied between about 0° C. and about 280° C. depending upon the type of products desired. The reaction temperature should be kept below about 280° C. due to the lack of stability of the fluorine-modified microcomposite at temperatures of over 280° C. A preferred temperature range is between about room temperature (25° C.) and about 250° C. In general, the activity of the catalyst composition is greater at the higher temperatures. That is, as temperature increases, the conversion of the olefin (or other suitable reactant) increases.

In general, the pressure in the alkylation reaction zone is maintained to keep the reactants in the liquid phase, and accordingly, will vary with the reactants employed and the reaction temperatures. Typical reaction zone pressure varies from about 69 kPa to about 13,800 kPa.

In additional to its use in catalyst compositions for alkylation reactions, the present fluorine-modified porous microcomposite can also be utilized in a catalyst composition in the isomerization of aromatics, such as xylene; acylation reactions; nitration reactions; and esterifications.

EXAMPLES

The microcomposite referred to in the examples below is a 13 wt % NAFION® resin in silica microcomposite and was prepared as described in the next paragraph using a NAFION® PFIEP NR 005 solution. NAFION® PFIEP NR 005 solution is available from DuPont NAFION® Products, Fayetteville, N.C., is also known as NAFION® SE-5110, and is prepared from resin which is approximately 6.3 tetrafluoroethylene molecules for every perfluoro(3,6-dioxa- 4-methyl-7-octenesulfonyl fluoride) molecule ($CF_2$=CF—O—($CF_2$CF($CF_3$)—O—$CF_2CF_2$—$SO_2$F). After hydrolysis of the resin, the PFIEP has an equivalent weight of approximately 1070. NAFION® PFIEP solutions can be purchased from Aldrich Chemical Co., Milwaukee, Wis., or PFIEP solutions generally can be prepared using the procedure of U.S. Pat. Nos. 5,094,995 and 4,433,082.

204 g of tetramethoxysilane (TMOS), 33 g of distilled water and 3 g of 0.04 M HCl was stirred for 45 min to give a clear solution. To 300 mL of a NAFION® PFIEP solution was added 150 mL of a 0.4 M NaOH solution, while the PFIEP solution was being stirred. After addition of the NaOH solution, the resulting solution was stirred for a further 15 min. The TMOS solution was added rapidly to the stirred PFIEP solution. After about 10–15 sec, the solution gelled to a solid mass. The gel was placed in an oven and dried at a temperature of about 95° C. over a period of about 2 days followed by drying under vacuum overnight. The hard, glass-like product was ground and passed through a 10-mesh screen. The material was then stirred with 3.5M HCl for 1 hour (with 500 mL of acid), followed by washing with 500 mL deionized water. The solid was collected by filtration. Acidification, washing and filtration were repeated a total of 5 times and after the final wash the solid was dried under vacuum at 100° C. for 24 hours.

Example 1

Preparation of Fluorine-Modified Porous Microcomposite

A 10 g sample of the microcomposite, prepared as described above, was dried at 150° C. in vacuum for 18 hours. The solid was then transferred to a nitrogen filled dry box. The microcomposite was placed in the bottom of an ca. 100 mL Nalgene bottle and was spread out on the bottom. A smaller Nalgene bottle was placed inside the larger bottle into which 10 g of a 70 wt % hydrogen fluoride/30 wt % pyridine solution was added. The outer bottle was then sealed and the material was left at room temperature for 48 hrs. Over this period a vapor of hydrogen fluoride reacted with the microcomposite and water condensed on the upper part of the vessel. After 48 hr the water was removed via wiping with a tissue, and then the microcomposite was re-dried at 150° C. for 18 hours. The dry fluorine-modified microcomposite catalyst was hydrophobic and was found to float on water. The fluorine content of the microcomposite increased by about 3 wt % relative to the original material.

Example 2

Benzene Propylation Using a Fluorine-Modified Microcomposite Catalyst vs. an Unmodified Microcomposite Catalyst Benzene propylation to cumene was tested with the fluorine-modified microcomposite catalyst prepared in Example 1 and the original starting microcomposite used to prepare the fluorine-modified microcomposite of Example 1. The alkylation reaction was carried out in the liquid phase under ambient pressure and 70° C. by bubbling propylene through the neat benzene solution containing the microcomposite catalyst. The benzene solution was presaturated with propylene at the reaction temperature and then the microcomposite catalyst was added. For each run, 1 g of microcomposite catalyst was added to a flask containing 50 g of benzene. Liquid samples were taken at certain time intervals and analyzed by gas chromatography. The fluorine-modified microcomposite catalyst was found to have about 4–5 times the catalytic activity as compared with the original unmodified microcomposite. The reaction rate of the fluorine-modified microcomposite catalyst was about 25 mM/hr/g.cat. The reaction rate of the unmodified microcomposite catalyst was 5.2 mM/hr/g.cat. After 1 hour cumene yield with the fluorine-modified microcomposite catalyst was 3.5%, and cumene yield with the unmodified microcomposite catalyst was 0.5%.

What is claimed is:

1. A fluorine-modified porous microcomposite, comprising: a perfluorinated ion-exchange polymer containing pendant sulfonic acid groups and/or carboxylic acid groups, wherein said polymer is entrapped within and highly dispersed throughout a network of inorganic oxide, said network having a plurality of fluoride groups bonded thereto.

2. The microcomposite of claim 1 wherein the inorganic oxide of the network is silica, alumina, titania, germania, zirconia, alumino-silicate, zirconyl-silicate, chromic oxide, iron oxide, and mixtures thereof.

3. The microcomposite of claim 1 wherein the perfluorinated ion-exchange polymer contains sulfonic acid groups and said polymer is about 10 to about 15% by weight of the microcomposite.

4. The microcomposite of claim 3 wherein the inorganic oxide of the network is silica.

5. A process for preparing a fluorine-modified porous microcomposite, comprising: contacting a porous microcomposite comprising a perfluorinated ion-exchange polymer containing pendant sulfonic acid groups and/or carboxylic acid groups, wherein said polymer is entrapped within and highly dispersed throughout a network of inorganic oxide, with an effective amount of a fluorinating agent under fluorinating conditions whereby a plurality of hydroxyl groups of the inorganic oxide network are replaced by fluoride groups.

6. The process of claim 5 wherein the fluorinating agent comprises a reagent selected from the group consisting of: hydrofluoric acid, a mixture of hydrogen fluoride and pyridine, ammonium fluoride, fluorine, and a compound having a group of the formula $R^1R^2R^3N^+$-fluorine, wherein each $R^1$, $R^2$ and $R^3$ are independently selected from an aliphatic or ring hydrocarbon.

7. The process of claim 5 wherein the inorganic oxide is silica and the fluorinating agent is a mixture of hydrogen fluoride and pyridine.

8. The process of claim 7 wherein the fluorinating agent comprises 70 wt % hydrogen fluoride/30 wt % pyridine.

9. In a method of alkylating an aromatic compound, the improvement comprising using an effective amount of a catalyst composition comprising a fluorine-modified porous microcomposite comprising a perfluorinated ion-exchange polymer containing pendant sulfonic acid groups and/or pendant carboxylic acid groups, wherein said polymer is entrapped within and highly dispersed throughout a network of inorganic oxide, said network having a plurality of fluoride groups bonded thereto.

10. The method of claim 9 wherein the aromatic compound is benzene and a reactant is propylene.

11. The method of claim 9 wherein the perfluorinated ion-exchange polymer contains sulfonic acid groups and said polymer is about 10 to about 15% by weight of the microcomposite.

12. The method of claim 11 wherein the inorganic oxide of the network is silica.

* * * * *